US011958175B2

(12) United States Patent
Filip et al.

(10) Patent No.: US 11,958,175 B2
(45) Date of Patent: Apr. 16, 2024

(54) HAND-HELD POWER TOOL

(71) Applicant: Hilti Aktiengesellschaft, Schaan (LI)

(72) Inventors: Eric Filip, Puchheim (DE); Jerome Jaromin, Munich (DE); Olaf Koch, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 175 days.

(21) Appl. No.: 17/253,209

(22) PCT Filed: Jul. 2, 2019

(86) PCT No.: PCT/EP2019/067696
§ 371 (c)(1),
(2) Date: Dec. 17, 2020

(87) PCT Pub. No.: WO2020/011595
PCT Pub. Date: Jan. 16, 2020

(65) Prior Publication Data

US 2021/0114196 A1 Apr. 22, 2021

(30) Foreign Application Priority Data

Jul. 11, 2018 (EP) .................................... 18182872

(51) Int. Cl.
*B25D 17/04* (2006.01)
*B25F 5/02* (2006.01)

(52) U.S. Cl.
CPC ................ *B25D 17/04* (2013.01); *B25F 5/02* (2013.01); *B25D 2211/068* (2013.01); *B25D 2250/121* (2013.01); *B25D 2250/261* (2013.01)

(58) Field of Classification Search
CPC .............. B25D 17/04; B25D 2211/068; B25D 2250/121; B25D 2250/261; B25D 17/00; B25F 5/02
See application file for complete search history.

(56) References Cited

U.S. PATENT DOCUMENTS 1,828,903 A * 10/1931 Moretti ................. B23B 45/001
200/332.2
3,847,233 A * 11/1974 Glover ..................... H01H 3/20
200/318.2

(Continued)

FOREIGN PATENT DOCUMENTS

AU 2004231219 A1 6/2005
CN 1157202 A 8/1997

(Continued)

OTHER PUBLICATIONS

International Search Report of PCT/EP2019/067696, dated Sep. 26, 2019.

*Primary Examiner* — Gloria R Weeks
*Assistant Examiner* — Mobeen Ahmed
(74) *Attorney, Agent, or Firm* — Davidson, Davidson & Kappel, LLC

(57) ABSTRACT

A handheld power tool has a monostable operating button 6 which has a stable switching position and a pressed switching position. A catch 32 which can be pivoted between a releasing position and a locking position in a pivoting direction 34 is provided, wherein the catch 32, in the locking position, stops the monostable operating button 6 in the pressed switching position. An operating knob 30 can be moved by the user in a shifting direction 31 which is perpendicular to the pivoting direction 34. The catch 32 is attached to the operating knob 30 by means of a joint 36. A slotted link 38 converts a movement of the catch 32 along the shifting direction 31 into a pivoting movement in the pivoting direction 34.

18 Claims, 3 Drawing Sheets

(56) References Cited

U.S. PATENT DOCUMENTS 4,348,603 A * 9/1982 Huber .................... H01H 9/063 200/522
5,681,214 A * 10/1997 Kleider .................... B28D 1/04 451/344
5,724,737 A * 3/1998 Stones ................ B27B 17/0008 200/321
6,355,892 B1 * 3/2002 Marks ...................... H01H 9/06 200/332.2
6,469,269 B1 * 10/2002 Jong ........................ H01H 9/06 200/332.2
6,489,578 B1 * 12/2002 Jung ...................... H01H 9/063 200/332.2
6,550,545 B1 * 4/2003 Manschitz ............... H01H 9/06 173/217
6,725,944 B2 * 4/2004 Burger ................. B25D 16/006 173/48
6,766,868 B2 * 7/2004 Frauhammer ........ B25D 16/006 173/4
6,800,825 B1 * 10/2004 Sasaki .................... H01H 21/24 200/402
7,828,073 B2 * 11/2010 Liebert .................... H01H 9/06 173/171
8,286,724 B2 * 10/2012 Furusawa ................ H01H 3/20 173/48
8,511,399 B2 * 8/2013 Kunz ....................... H01H 3/20 173/171
10,919,137 B2 * 2/2021 Iida ...................... B25D 16/006
2003/0037937 A1 * 2/2003 Frauhammer ........... B25F 5/006 173/48
2003/0226673 A1 * 12/2003 Burger ................. B25D 16/006 173/48
2006/0011361 A1 * 1/2006 Shimma ................... H01H 9/06 173/48
2006/0060365 A1 * 3/2006 Kunz ..................... H01H 13/08 173/217
2006/0185865 A1 * 8/2006 Jung .................... B25D 16/006 173/48
2006/0185866 A1 * 8/2006 Jung .................... B25D 16/006 173/48
2006/0254785 A1 * 11/2006 Watanabe ............ B25D 16/006 173/48
2008/0011592 A1 1/2008 Liebert et al.
2008/0017396 A1 * 1/2008 Kristen ................ B25D 16/006 173/162.2
2009/0008111 A1 * 1/2009 Liebert ................ B25D 16/006 173/217
2009/0056965 A1 3/2009 Moessnang
2010/0175972 A1 * 7/2010 Kimata .................. H01H 9/282 200/318.1
2010/0236800 A1 * 9/2010 Watanabe ............ B25D 17/043 173/162.2
2011/0308920 A1 * 12/2011 Shi ............................ B25F 5/02 200/43.17
2012/0132689 A1 * 5/2012 Dittrich ..................... B25C 1/08 227/10
2013/0206434 A1 * 8/2013 Braun ....................... B25F 5/02 173/2
2014/0027253 A1 * 1/2014 Braun .................... H01H 9/226 200/61.58 R
2017/0129091 A1 * 5/2017 Schiegel ................ B25D 16/00
2018/0021931 A1 * 1/2018 Abe ....................... B25D 17/24 173/48
2018/0085906 A1 * 3/2018 Nitsch .................. B25D 16/006
2018/0099395 A1 * 4/2018 Iida .......................... H01H 9/06
2018/0250802 A1 * 9/2018 Iida ...................... B25D 16/006
2018/0304453 A1 * 10/2018 Schaer ..................... B25F 5/001
2018/0361553 A1 * 12/2018 Brinkmann ............... B25F 5/00
2019/0061081 A1 * 2/2019 Schaer ............... B23Q 11/0092

FOREIGN PATENT DOCUMENTS

| | | | |
|---|---|---|---|
| DE | 102005000137 | A1 | 4/2007 |
| DE | 102006000287 | A1 | 12/2007 |
| DE | 102006000316 | A1 | 1/2008 |
| DE | 102007000362 | A1 | 1/2009 |
| DE | 102007000470 | A1 | 3/2009 |
| DE | 102008041511 | A1 | 3/2010 |
| EP | 1369207 | A1 | 12/2003 |
| EP | 1864761 | A1 | 12/2007 |
| JP | 2008119755 | A | 5/2008 |

* cited by examiner

HAND-HELD POWER TOOL

FIELD OF THE INVENTION

The invention relates to a handheld power tool which has a mechanism for locking an operating button in an operated position.

SUMMARY OF THE INVENTION

One embodiment of a handheld power tool has a tool holder for holding a tool, a percussion mechanism, an electric motor for driving the percussion mechanism, a monostable operating button which has a stable switching position and a pressed switching position, and a device controller which switches off the electric motor in response to the stable switching position and which activates the electric motor in response to the pressed switching position. A catch is provided, which catch can be pivoted between a releasing position and a locking position in a pivoting direction, wherein the catch, in the locking position, stops the monostable operating button in the pressed switching position. An operating knob can be moved by the user in a shifting direction which is perpendicular to the pivoting direction. The catch is attached to the operating knob by means of a joint. A slotted link converts a movement of the catch along the shifting direction into a pivoting movement in the pivoting direction.

One advantage of the catch for locking the operating button is its simple assembly. The catch and the associated operating knob form one physical unit which can be installed in a single assembly step. The associated slotted link can be part of a housing of the handheld power tool or can be integrally formed on the housing.

BRIEF DESCRIPTION OF THE DRAWINGS

The following description explains the invention on the basis of exemplary embodiments and figures, in which.

Identical or functionally identical elements are indicated by the same reference symbols in the figures, unless stated otherwise.

DETAILED DESCRIPTION

Figure 1:
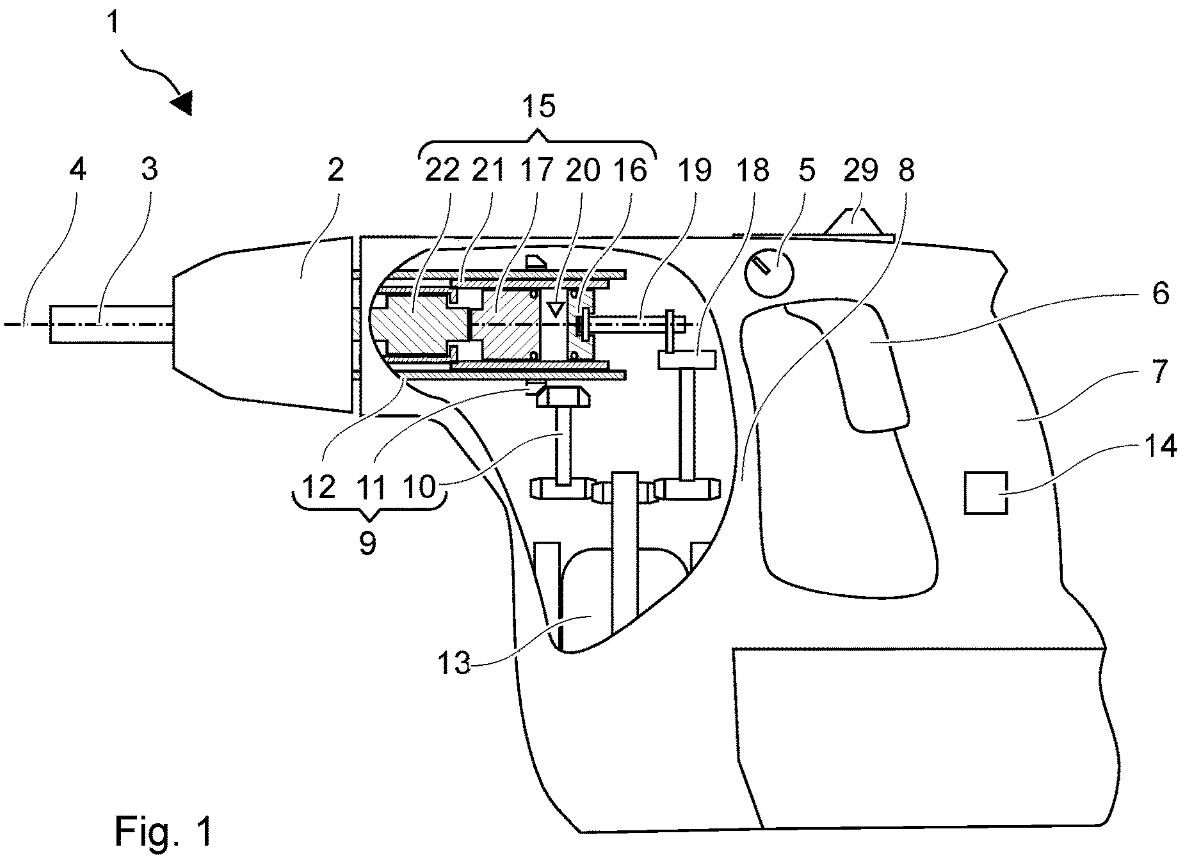
FIG. 1 shows a hammer drill

FIG. 1 schematically shows a hammer drill 1 as an example of a portable handheld power tool. The exemplary hammer drill 1 has a tool holder 2 into which a tool 3 can be inserted and locked. The tool 3 is, for example, a drill, a chisel etc. The embodiment illustrated by way of example turns the tool holder 2 about a working axis 4 and at the same time periodically strikes the tool along the working axis 4. The handheld power tool 1 can have a mode selector switch 5 which allows the user to selectively activate and deactivate the rotational movement and selectively activate and deactivate the percussive operation. The user can operate the handheld power tool 1 by way of a monostable operating button 6.

The handheld power tool 1 has a handle 7. The user can hold and control the handheld power tool 1 during operation by way of the handle 7. The operator switch 6 is preferably attached to the handle 7 in such a way that the user can operate the operating switch 6 using the hand holding the handle 7. The handle 7 can be decoupled from a machine housing 8 by means of damping elements.

The handheld power tool 1 has a rotary drive 9 which is coupled to the tool holder 2. The rotary drive 9 can have, amongst other things, a step-down gear mechanism 10 and a slip clutch 11. An output shaft 12 of the rotary drive 9 is connected to the tool holder 2. The rotary drive 9 is coupled to an electric motor 13. The user can switch on and switch off the electric motor 13 by operating the operating button 6, wherein the operating button 6 accordingly controls a power supply to the electric motor 13. In one embodiment, a rotation speed of the electric motor 13 can be adjusted by means of the operating button 6. A device controller 14 detects the position of the operating button 6 and actuates the electric motor 13 in response.

The handheld power tool 1 has a pneumatic percussion mechanism 15. The pneumatic percussion mechanism 15 has an exciter piston 16 and a percussion piston 17. The exciter piston 16 is rigidly coupled to the electric motor 13. An eccentric gear 18 and a connecting rod 19 transform the rotational movement of the electric motor 13 into a translatory movement on the working axis 4. The exciter piston 16 and the percussion piston 17 close off a pneumatic chamber 20 between them. In the illustrated embodiment, radial closure of the pneumatic chamber 20 is provided by a guide tube 21 which at the same time guides the exciter piston 16 and the percussion piston. In other embodiments, the percussion piston can be of hollow design and the exciter piston 16 is guided in the percussion piston, or vice versa. The air enclosed in the pneumatic chamber 20 is compressed and decompressed by the exciter piston 16. The change in pressure couples the percussion piston to the movement of the exciter piston 16, and the pneumatic chamber 20 behaves similarly to a spring, and is therefore also called a pneumatic spring. The percussion piston 17 can strike the tool 3 directly or strike the tool indirectly by means of an anvil 22.

Figure 2:
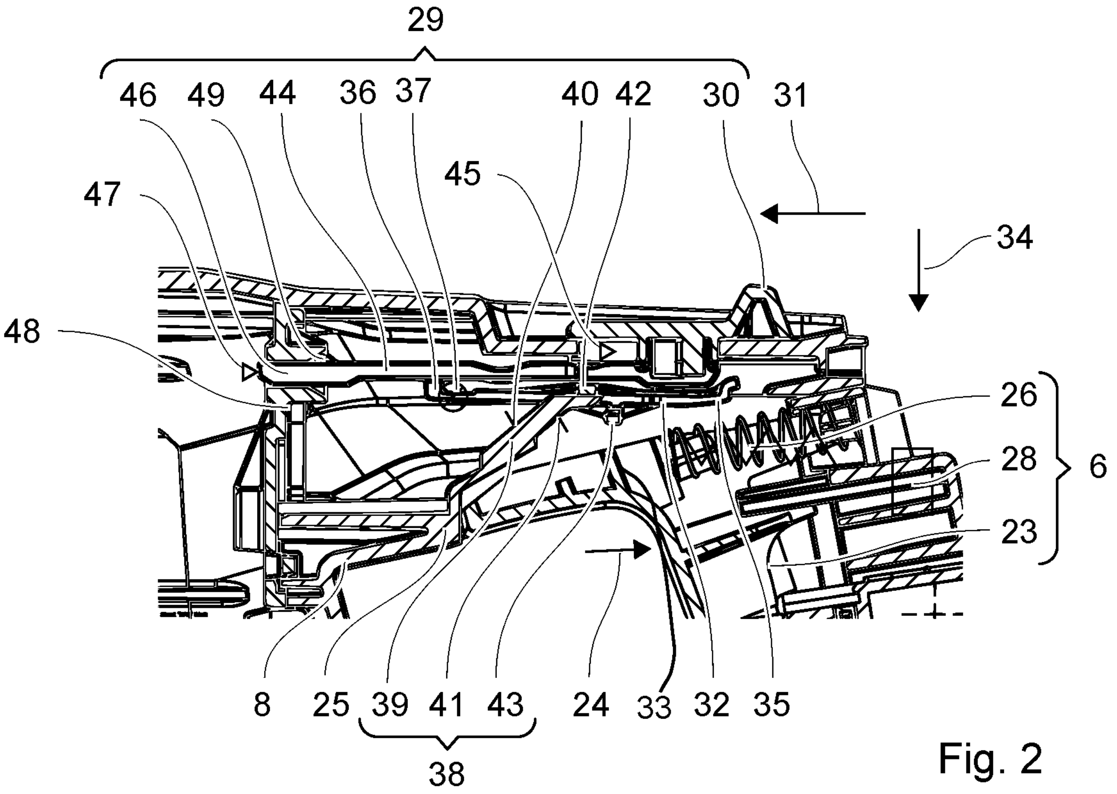
FIG. 2 shows an inoperative position of the operating button
Figure 3:
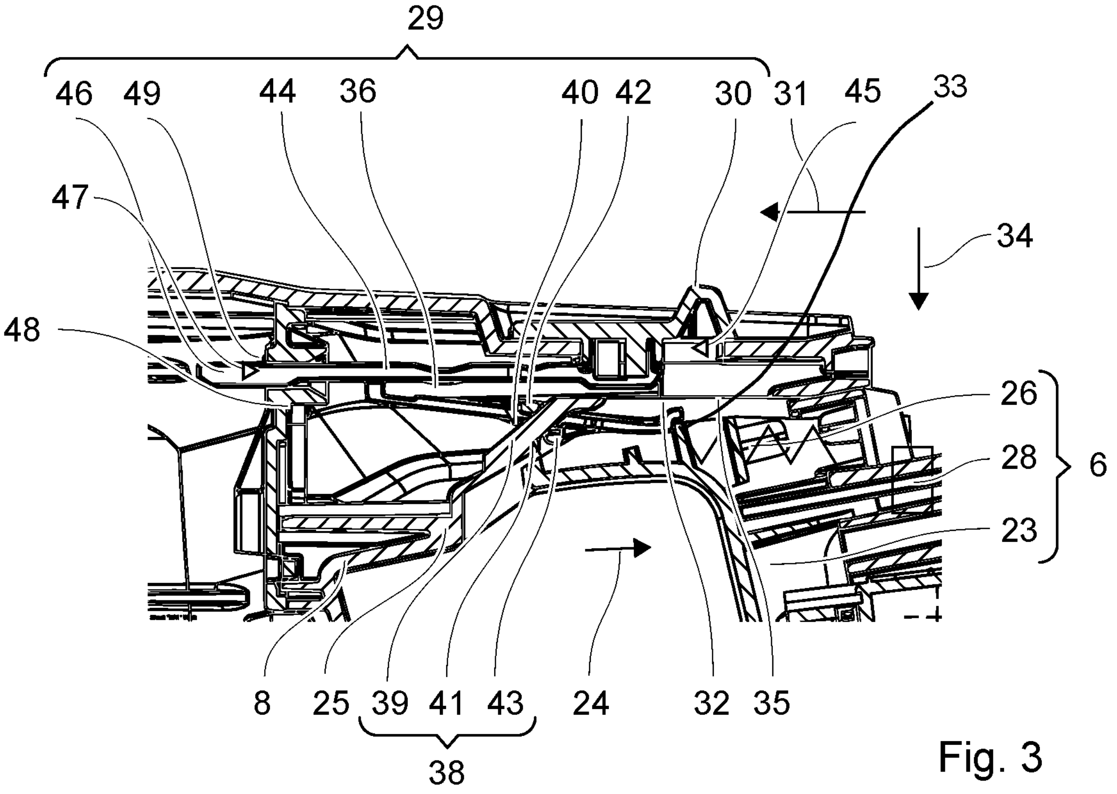
FIG. 3 shows a locked position of the operating button

The handheld power tool 1 is switched on and switched off by the operating button 6. The operating button 6 is arranged in the handle 7. The operating button 6 has a switching cap 23 (see, e.g. FIGS. 2 and 3) which the user can grip. The switching cap 23 protrudes from the handle 7 counter to a switching direction 24 in an inoperative position of the operating button 6 (FIG. 2). The switching cap 23 preferably bears against a stop 25 of the machine housing 8. The user can press the switching cap 23 into a pressed switching position in the switching direction 24 (FIG. 3). In the process, the switching cap 23 can slide or pivot into the handle 7. The switching cap 23 can be pivoted about a bearing point, as in the illustrated example, or can be linearly guided. The switching cap 23 is at a distance from the stop 25. The switching cap 23 is acted on by a restoring element 26, for example a helical spring, with a force which acts counter to the switching direction 24. The restoring element 26 is tensioned to a greater extent in the pressed switching position than in the inoperative position, as a result of which the switching cap 23 is stable only in the inoperative position. The switching cap 23 returns to the inoperative position when the user releases the switching cap 23. The switching direction 24 is preferably antiparallel to the working direction 27 in which the tool 3 faces.

The switching cap 23 is coupled to a switching mechanism 28 of the operating button 6. The switching mechanism 28 deactivates the electric motor 13 when the switching cap 23 is in the inoperative position. The switching mechanism 28 activates the electric motor 13 when the switching cap 23 is in the pressed position. The switching mechanism 28 can comprise an electromechanical, optical, magnetic or other sensor for determining the position of the switching cap 23. In one embodiment, the switching mechanism 28 can adjust a rotation speed or power consumption of the electric motor 13 depending on positions which are pressed to different extents.

The handheld power tool 1 has a locking switch 29. The locking switch has a releasing position (FIG. 2) and a locking position (FIG. 3).

The locking switch 29 has an operating knob 30 which can be gripped by the user. The user can move the operating knob 30 between a first position and a second position in shifting direction 31. The first position is associated with the releasing position of the locking switch 29 and the second position is associated with the locking position of the locking switch 29. The shifting direction 31 is preferably antiparallel to the switching direction 24 of the operating button 6.

The locking switch 29 has a pivotable catch 32 which engages into the switching cap 23 in the locking position. The catch 32 stops the movement of the switching cap 23 counter to the switching direction 24 and therefore stops the switching cap 23 from returning to the inoperative position. The operating button 6 remains in the pressed switching position. The electric motor 13 remains activated, even if the user releases the switching cap 23.

The catch 32 interacts with the switching cap 23. The switching cap 23 has a locking area 33 against which the catch 32 can bear in the locking position. The locking area 33 can be realized by the outer contour of the switching cap 23 or by a rib which is accessible from the outside, or the like. The locking area 33 is preferably largely perpendicular to the switching direction 24. The locking area 33 faces away from the switching direction 24 and in the direction of the catch 32.

The catch 32 can be pivoted in a pivoting direction 34 which is perpendicular to the switching direction 24. The catch 32 can be pivoted between a first position, which is associated with the releasing position, and a second position, which is associated with the locking position, in the switching direction 24. The catch 32 does not overlap with the blocking area 33 in the releasing position. The overlap relates to the switching direction 24, i.e. the overlap can be determined perpendicular to the switching direction 24 in the projection onto a plane. The catch 32 overlaps with the stop 33 in the locking position. A tip 35 of the catch 32 bears against the locking area 33 in the switching direction 24. Similarly to the gripping hand, the tip 35 exerts a counterforce to the restoring element, as a result of which the operating switch 6 remains pressed.

The position of the tip 35 along the switching direction 24 corresponds to the position of the stop 33 along the switching direction 24 when the operating button 6 is pressed. The tip 35 can protrude beyond the stop 33 in the switching direction 24 when the operating button 6 is in the inoperative position. The locking switch 29 is inoperable when the handheld power tool 1 is switched off.

The catch 32 is fastened to the operating knob 30 in a resilient manner. A joint 36 connects the operating knob 30 and the catch 32. The joint 36 can be pivoted about an axis 37 which is perpendicular to the pivoting direction 34. The joint 36 is preferably designed as a flexure bearing. The joint 36 consists of the same material as the catch 32 and preferably as the operating knob 30. The joint 36 has a lower rigidity than the catch 32 in the pivoting direction 34. The low rigidity is realized by a low thickness, i.e. smaller dimension along the pivoting direction 34. The joint 36 can reversibly, possibly elastically, deform provided that the catch 32 can be pivoted between the locking and releasing position. The joint 36 is preferably tensioned in the locking position and free of force in the releasing position.

A slotted link 38 pivots the catch 32 in response to the position of the operating knob 30. The slotted link 38 comprises a rail 39, which runs in an inclined manner, on the machine housing 8. The rail 39 rises in the pivoting direction 34 along the shifting direction 31. The rail 39 has, with respect to the pivoting direction 34, a lower guide face 40 and an upper guide face 41. In the example, the lower guide face 40 faces the operating knob 30; the upper guide face 42 is averted from the operating knob 30. The catch 32 has a lower finger 42 which runs on the lower guide face 40 and an upper finger 43 which runs on the upper guide face 42. In the event of a movement of the operating knob 30 in the shifting direction 31, the upper finger 43, in order to follow the upper guide face 41, pulls the catch 32 in the pivoting direction 34. In the event of a movement counter to the shifting direction 31, the lower finger 42, in order to follow the lower guide face 40, presses the catch 32 against the pivoting direction 34.

The joint 36 is preferably arranged offset in relation to the slotted link 38 in the shifting direction 31. The joint 36 is deflected between the releasing position and the locking position through a maximum of 10 degrees. This is rendered possible, amongst other things, on account of the catch 32 being fastened to the operating knob 30 by means of the joint 36 and in this way being displaced along the shifting direction 31 with the operating knob 30.

The operating knob 30 can have a carrier rod 44. The carrier rod 44 is oriented along the shifting direction 31 and suspended in a manner guided such that it can move along the shifting direction 31. The operating knob 30 is fastened at one end of the carrier rod 44. The operating knob 30 is mounted at an aperture 45 in the machine housing 8. The other end of the carrier rod 44 has a head 46 which is mounted in an eyelet 47 such that it can move along the shifting direction 31. The eyelet 47 can be provided, for example, in a plate 48 which is perpendicular to the shifting direction 31. The joint 36 is preferably fitted between the operating knob 30 and the head 46.

Figure 4:
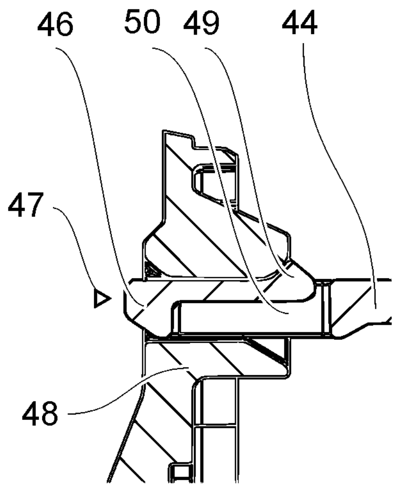
FIG. 4 shows a partial illustration of FIG. 3
Figure 5:
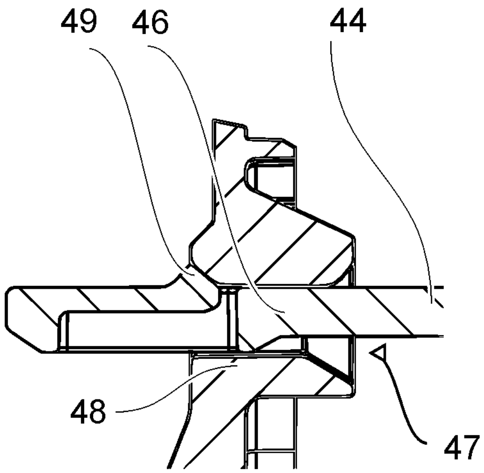
FIG. 5 shows a partial illustration of FIG. 4

The head 46 can have a resilient latching lug 49 (FIG. 4, FIG. 5). The latching lug 49 creates a pressure point when the user moves the operating knob 30 between the releasing position and the locking position, and vice versa. The resilient latching lug 49 protrudes in relation to the hollow cross section of the eyelet 47 in the unloaded state. The latching lug 49 is deflected when the latching lug 49 is pushed through the eyelet 47. The latching lug 49 can pivot into a hollow space 50 in the head 46. The latching lug 49 is prestressed in the hollow space. On the other side of the eyelet 47, the prestress ensures said latching lug pivots out of the hollow space, as a result of which the latching lug 49 again protrudes in relation to the hollow cross section of the eyelet 47.

What is claimed is:

1. A handheld power tool comprising:

a tool holder for holding a tool;

a percussion mechanism;

an electric motor for driving the percussion mechanism;

a monostable operating button having a stable switching position and a pressed switching position;

a device controller switching off the electric motor in response to the stable switching position and activating the electric motor in response to the pressed switching position;

a catch pivotable between a releasing position and a locking position in a pivoting direction, the catch, in the locking position, stopping the monostable operating button in the pressed switching position;

an operating knob movable by the user in a shifting direction perpendicular to the pivoting direction;

a joint, the catch attachable to the operating knob via the joint, the joint fastening the catch to the operating knob in both the releasing and the locking position; and a link converting a movement of the catch along the shifting direction into a pivoting movement in the pivoting direction.

2. The handheld power tool as recited in claim 1 wherein the link has a rail arranged on a machine housing, the rail being inclined in relation to the shifting direction, and the catch having at least one finger resting on the rail.

3. The handheld power tool as recited in claim 1 wherein the joint is pivotable about an axis perpendicular to a plane spanned by the shifting direction and the pivoting direction.

4. The handheld power tool as recited in claim 1 wherein the joint is a flexure bearing made of a same material as the operating knob.

5. The handheld power tool as recited in claim 1 further comprising a carrier rod guided to move along the shifting direction, the operating knob being guided at one end of the carrier rod and an other end of the carrier rod being guided in an eyelet, the joint being arranged on the carrier rod between the one end and the other end.

6. The handheld power tool as recited in claim 5 further comprising a resilient latching lug at the other end, the latching lug protruding in relation to a hollow cross section of the eyelet in the unloaded state.

7. The handheld power tool as recited in claim 1 wherein the catch is fastened to the operating knob in a resilient manner via the joint.

8. The handheld power tool as recited in claim 1 wherein the joint is made of a same material as the catch.

9. The handheld power tool as recited in claim 8 wherein the joint is made of a same material as the operating knob.

10. The handheld power tool as recited in claim 1 wherein the joint is made of a same material as the operating knob.

11. The handheld power tool as recited in claim 1 wherein the joint has a lower rigidity than the catch in the pivoting direction.

12. The handheld power tool as recited in claim 11 wherein the joint has the lower rigidity than the catch in the pivoting direction due to a lower thickness than the catch along the pivoting direction.

13. The handheld power tool as recited in claim 1 wherein the joint is reversibly deformable.

14. The handheld power tool as recited in claim 13 wherein the joint is reversibly deformable as the catch is pivoted between the locking and releasing position.

15. The handheld power tool as recited in claim 14 wherein the joint is tensioned in the locking position and free of force in the releasing position of the catch.

16. A handheld power tool comprising:

a tool holder for holding a tool;

a percussion mechanism;

an electric motor for driving the percussion mechanism;

a monostable operating button having a stable switching position and a pressed switching position;

a device controller switching off the electric motor in response to the stable switching position and activating the electric motor in response to the pressed switching position;

a catch pivotable between a releasing position and a locking position in a pivoting direction, the catch, in the locking position, stopping the monostable operating button in the pressed switching position;

an operating knob movable by the user in a shifting direction perpendicular to the pivoting direction;

a joint, the catch attachable to the operating knob via the joint; and a link converting a movement of the catch along the shifting direction into a pivoting movement in the pivoting direction;

wherein the joint is a flexure bearing made of a same material as the operating knob.

17. A handheld power tool comprising:

a tool holder for holding a tool;

a percussion mechanism;

an electric motor for driving the percussion mechanism;

a monostable operating button having a stable switching position and a pressed switching position;

a device controller switching off the electric motor in response to the stable switching position and activating the electric motor in response to the pressed switching position;

a catch pivotable between a releasing position and a locking position in a pivoting direction, the catch, in the locking position, stopping the monostable operating button in the pressed switching position;

an operating knob movable by the user in a shifting direction perpendicular to the pivoting direction;

a joint, the catch attachable to the operating knob via the joint; and a link converting a movement of the catch along the shifting direction into a pivoting movement in the pivoting direction;

wherein the joint has a lower rigidity than the catch in the pivoting direction.

18. The handheld power tool as recited in claim 17 wherein the joint has the lower rigidity than the catch in the pivoting direction due to a lower thickness than the catch along the pivoting direction.

* * * * *